United States Patent [19]

Fisher et al.

[11] 4,276,624

[45] Jun. 30, 1981

[54] ACOUSTIC TRANSMISSION SYSTEM

[76] Inventors: Charles B. Fisher, 2850 Hill Park Rd., Montreal, Quebec, Canada, H3H 1T1; Sidney T. Fisher, 53 Morrison Ave., Town of Mt. Royal, Montreal, Quebec, Canada, H3R 1K3

[21] Appl. No.: 66,182

[22] Filed: Aug. 13, 1979

[51] Int. Cl.³ .......................................... H04B 11/00
[52] U.S. Cl. ................................ 367/134; 367/132; 455/40; 455/63; 455/306
[58] Field of Search ................. 367/132, 134; 455/40, 455/63, 284, 305, 306

[56] References Cited

U.S. PATENT DOCUMENTS

| 2,116,814 | 5/1938 | Wilbur | 455/306 |
| 3,218,607 | 11/1965 | Brock et al. | 367/132 |
| 4,178,553 | 12/1979 | Fisher et al. | 325/487 |

OTHER PUBLICATIONS

P. F. Panter, "Modulation, Noise and Spectral Analysis," McGraw-Hill, 1965, pp. 506-547.
Marcus, "Sourcebook of Electronic Circuits," New York, 1968, pp. 278 and 529.
S. Prigozy, "Electronics," Apr. 19, 1965, p. 91.

Primary Examiner—Richard A. Farley

[57] ABSTRACT

An acoustic transmission system for a gaseous or liquid transmission medium, in which the transmitting apparatus double-sideband amplitude modulates a carrier with the signal to be transmitted, the double-sideband amplitude modulated carrier is radiated acoustically over the transmission medium, and the receiving apparatus receives the modulated carrier plus noise introduced in the medium, rejects the superimposed noise by sampling and reconstruction means, and delivers the modulated carrier substantially free from superimposed noise.

6 Claims, 2 Drawing Figures

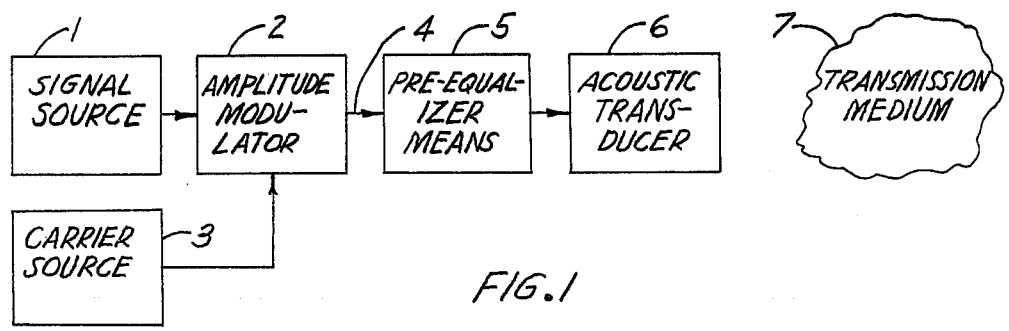
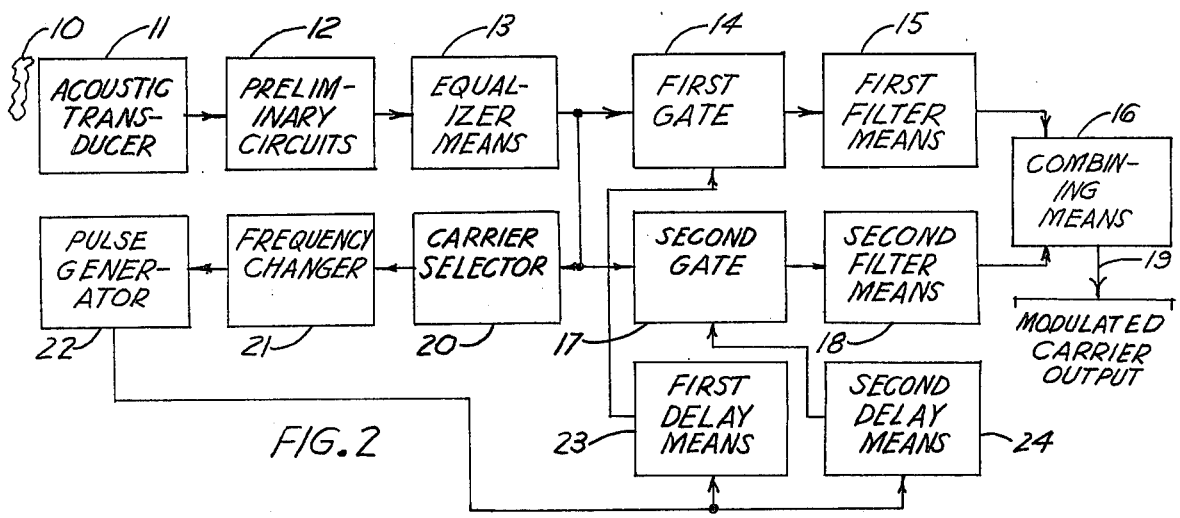

4,276,624

ACOUSTIC TRANSMISSION SYSTEM

BACKGROUND OF THE INVENTION

Signals are transmitted acoustically in the prior art with air or water as a medium. We do not known of any prior patent art, publications or apparatus which disclose transmission of a signal over a gaseous or liquid medium as a double-sideband amplitude modulated carrier, with rejection of noise from the medium in the receiving apparatus by sampling and reconstruction means to produce the modulated carrier substantially free superimposed noise. The sampling principle is fully described by P. F. Panter in "Modulation, Noise, and Spectral Analysis", McGraw-Hill 1965, pages 506 to 547 inclusive. The reduced Nyquist frequency for a double-sideband amplitude modulated carrier is disclosed in U.S. Pat. No. 4,178,553, class 325/487, "Sampling Modulated Waves", issued Dec. 11, 1979 to Fisher et al.

SUMMARY OF THE INVENTION

A signal to be transmitted acoustically over a gaseous or liquid medium is used in the transmitting apparatus of the system to double-sideband amplitude modulate a carrier of substantially constant amplitude and frequency and the modulated carrier is radiated acoustically over the transmission medium. At the receiving apparatus the modulated carrier plus noise from the medium is received and converted to electric current by a transducer. The modulated carrier plus noise is sampled in a gate at a frequency greater than the Nyquist frequency for the modulated carrier, at instants of Zero crossings of the carrier, to produce a first sequence of samples of the noise less the modulated carrier. The modulated carrier is sampled a second time, at the same frequency as the first sequence, at approximate instants of peaks of alternate polarity of the carrier, to produce a second sequence of samples with reversed polarity from the first sequence, of the modulated wave plus noise. The two sequences of samples are reconstructed by integration substantially free from noise, or may be reconstructed in separate filters and the filter outputs combined, to produce the signal-modulated carrier substantially free from superimposed noise.

LIST OF DRAWINGS

FIG. 1 shows in simplified block schematic form the transmitting apparatus of a system according to the invention.

FIG. 2 shows in simplified block schematic form receiving apparatus according to the invention, in which the modulated carrier plus noise is sampled in two gates, and integrated in two filters, whose output is combined.

DETAILED DESCRIPTION OF THE INVENTION

In FIG. 1 a signal source 1, of a signal to be transmitted over a gaseous or liquid medium, modulates a carrier of substantially constant frequency and amplitude from carrier source 3, in a double-sideband amplitude modulator 2. The double-sideband amplitude modulated carrier on lead 4 may be pre-equalized in pre-equalizer 5. This process may be desirable in cases where the transmission medium between the transmitting apparatus and the nearest receiving apparatus materially alters the levels or the times of arrival of the two sidebands of the carrier at the receiving apparatus. Pre-equalizer 5 may be followed by an amplifier, not shown, such as the linear high-efficiency amplifier of U.S. Pat. No. 4,153,882, Class 330/10, issued May 8, 1979 to Fisher et al. The modulated carrier is delivered to and radiated acoustically to the transmission medium 7 by acoustic transducer 6. This may be a gaseous or liquid high-power transducer as disclosed in U.S. Pat. No. 4,162,475, class 340/8R, issued July 24, 1979 to Fisher et al.

FIG. 2 show a simplified block schematic diagram of receiving apparatus according to the invention. The modulated carrier plus noise in transmission medium 10 is converted by acoustic transducer 11 to electric currents. These currents pass through preliminary circuits 12 which may comprise amplifiers, frequency shifting circuits and selective means, and which deliver a carrier double-sideband amplitude modulated by the signal, plus noise, to equalizer 13. This equalizer may be adjustable and may be required to equalize the levels and the times of arrival of the components of the modulated carrier, so that a materially accurate double-sideband amplitude modulated carrier is delivered to sampling gates 14 and 17. In first gate 14 the modulated carrier plus noise is sampled at a frequency greater than the Nyquist frequency for the modulated carrier, at approximate instants of zero crossings of the carrier at the input to gate 14, by a first sequence of gating pulses, thus producing a first sequence of samples of the modulated carrier plus noise, containing no components of the modulated carrier. The first sequence of samples is integrated in first integrating filter 15, which may be a band-pass filter with the pass-hand of the modulated carrier, to produce the noise, in accordance with sampling theory. This noise is delivered to a first input of combining circuit 16.

In second gate 17 the modulated carrier plus noise is sampled at a frequency greater than the Nyquist frequency for the modulated carrier, at approximate instants of peaks of alternate polarity of the carrer, at the input to gate 17, by a second sequence of gating pulses, thus producing a second sequence of samples, of the modulated carrier plus noise, containing components of the modulated carrier and the noise. The second sequence of samples is integrated in second integrating filter 18, which may be a band-pass filter with the pass band of the modulated carrier, to produce the modulated carrier plus noise, in accordance with sampling theory. The modulated carrier plus noise is delivered to the second input of combining circuit 16, which causes the noise inputs to cancel, and the modulated carrier substantially free from noise to appear on output lead 19. The modulated carrier may be demodulated in a well-known manner to recover the signal. The two sequences of gating pulses required in FIG. 2 are derived from the carrier, which is selected from equalizer 13 output, free from noise and sidebands, in carrier selector 20, using means such as amplitude limiting, selectivity and oscillator synchronization. The output of carrier selector 20 is changed in frequency by the ratio of two integers in frequency changer 21 and drives pulse generator 22 to produce a sequence of gating pulses with a frequency greater than the Nyquist frequency for the modulated carrier, and equal to twice the carrier frequency divided by an odd integer. The output of generator 22 is delivered to first pulse delay circuit 23, which delivers a first sequence of gating pulses to first gate 14 at approximate instants of zero crossings of the carrier at gate 14. Generator 22 also delivers the sequence of pulses to second pulse delay circuit 24 which delivers a second sequence of gating pulses to second gate 17 at approximate instants of carrier peaks of alternate polarity.

This system of transmission obviously includes the case where the carrier has zero modulation, and is itself the signal to be transmitted. In this case the second sequence of samples is taken at peaks of a single polarity of the carrier, the integrating filter is a low-pass filter, and the output of the filter is direct current substantially free from noise.

What we claim is:

1. A system for the acoustic transmission of a signal over a gaseous or liquid transmission medium which comprises transmitting apparatus which emits a carrier of substantially constant frequency and amplitude, double-sideband amplitude modulated by said signal, as an acoustic wave over said transmission medium between said transmitting apparatus and receiving apparatus which receives said acoustic modulated carrier, with superimposed noise present in the transmission medium from other sources, and which rejects said superimposed noise by sampling, reconstruction and subtraction means, and derives said signal-modulated carrier substantially free from said superimposed noise.

2. A system for the acoustic transmission of a signal over a liquid or gaseous transmission medium in accordance with claim 1, in which said transmitting apparatus comprises:
 a carrier source which generates said carrier of substantially constant amplitude and frequency, and
 an amplitude modulator which receives said carrier and said signal to be transmitted over said liquid or gaseous medium, and which double-sideband amplitude modulates said carrier with said signal, and
 pre-equalizer means which corrects said carrier after amplitude modulation for frequency and delay distortion caused by said acoustic transmission of said carrier over said liquid or gaseous transmission medium for a predetermined distance, and
 acoustic transducer means which radiates said carrier after amplitude modulation to said liquid or gaseous transmission medium.

3. A system for the acoustic transmission of a signal over a liquid or gaseous transmission medium in accordance with claim 1, in which said receiving apparatus includes frequency and phase equalizer means which corrects said modulated carrier as received for deviation of its frequency and phase characteristics from those of a constant-frequency, constant-amplitude carrier with double-sideband amplitude modulation.

4. A system for the acoustic transmission of a signal over a liquid or gaseous transmission medium in accordance with claim 1, in which said receiving apparatus comprises:
 acoustic transducer receiving means for said modulated carrier plus said superimposed noise from said transmission medium, and
 selection means which delivers said superimposed noise substantially free from said modulated carrier, and
 subtraction means which subtracts said superimposed noise, substantially free from said modulated carrier, from said modulated carrier plus said superimposed noise, to produce said modulated carrier substantially free from said superimposed noise.

5. A system for the acoustic transmission of a signal over a liquid or gaseous transmission medium in accordance with claim 4, in which said selection means which delivers said superimposed noise and said subtraction means which subtracts said superimposed noise from said modulated carrier plus said superimposed noise, comprise:
 a first gate, opened by a first sequence of pulses from pulse generating means timed from said carrier, with a frequency greater than the Nyquist frequency for said modulated carrier, and equal to twice the carrier frequency divided by an odd integer, occurring at approximate instants of zero crossings of said carrier, to produce a first sequence of samples, which fully define said superimposed noise substantially free from said modulated carrier, and
 first filter means with a pass band substantially the same as the frequency band of said modulated carrier which reconstructs said first sequence of samples to produce said superimposed noise substantially free from said modulated carrier, and
 a second gate, opened by a second sequence of pulses timed from said carrier, with a frequency equal to the frequency of said first sequence of pulses, occurring at approximate instants of peaks of alternate polarity of said carrier, from said pulse generating means, to produce a second sequence of sample, which fully define said modulated carrier plus said superimposed noise, and
 second filter means with a pass band the same as the frequency band of said modulated carrier, which reconstructs said second sequence of samples to produce said modulated carrier and said superimposed noise, and
 combining means, in which the output of said first filter means is subtracted from the output of said second filter means, to produce said modulated carrier substantially free from said superimposed noise.

6. A system for the acoustic transmission of a signal over a liquid or gaseous transmission medium in accordance with claim 4, in which said receiving apparatus comprises:
 preliminary circuit means which receives and delivers said modulated carrier plus noise derived from said transducer means, and
 equalizer means which receives said modulated carrier plus said superimposed noise and provides equalization of frequency response and delay across the band of said modulated carrier so as to deliver a substantially accurate double-sideband amplitude modulated wave, and
 a first sampling gate which receives said modulated carrier plus said superimposed noise, and takes a first sequence of samples at a frequency greater than the Nyquist frequency for said modulated carrier, when opened by a first sequence of gating pulses at approximate instants of zero crossings of said modulated carrier at said first sampling gate, from pulse generator means, and
 first filter means which receives said first sequence of pulses and reconstructs said superimposed noise substantially free from said modulated carrier and delivers said noise to a first input of a combining means, and
 a second sampling gate which receives said modulated carrier plus said superimposed noise, and takes a second sequence of samples at the same frequency as said first sequence of samples, when opened by a second sequence of gating pulses, at approximate instants of peaks of alternate polarity of said modulated carrier at said second sampling gate, from said pulse generator means, and second filter means which receives said second sequence of pulses and reconstructs said modulated carrier and said superimposed noise and delivers said modulated carrier and said superimposed noise to a second input of said combining means, which delivers said modulated carrier substantially free from said superimposed noise, and carrier selector means which receives said modulated carrier plus said superimposed noise and produces said carrier substantially free from modulation and said superimposed noise, and frequency changer means which receives the output of said carrier selector means and changes the frequency of said carrier by the ratio of two integers, and said pulse generator means which generates pulses from the output of said frequency changer means at a frequency greater than the Nyquist frequency of said modulated carrier, and equal to said carrier frequency multiplied by two and divided by an odd integer, and first pulse delay means which receives the output of said pulse generator means and delays said pulses to occur at approximate instants of zero crossings of said modulated carrier, and delivers said delayed pulses as gating pulses to said first sampling gate, and second pulse delay means which receives the output of said pulse generator means and delays said pulses to occur at approximate instants of peaks of alternate polarity of said carrier, and delivers said delayed pulses as gating pulses to said second sampling gate.

* * * * *